United States Patent
Holden et al.

(10) Patent No.: US 7,840,705 B2
(45) Date of Patent: *Nov. 23, 2010

(54) SYSTEM AND PROGRAM PRODUCT FOR REPLICATING MESSAGE STATUS CHANGES ACROSS MESSAGING SYSTEMS

(75) Inventors: Russell L. Holden, Westford, MA (US); Damien F. Katz, Chelmsford, MA (US); William A. Spencer, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 167 days.

This patent is subject to a terminal disclaimer.

(21) Appl. No.: 12/145,933

(22) Filed: Jun. 25, 2008

(65) Prior Publication Data

US 2009/0063644 A1    Mar. 5, 2009

Related U.S. Application Data

(63) Continuation of application No. 10/730,246, filed on Dec. 8, 2003, now Pat. No. 7,478,131.

(51) Int. Cl.
*G06F 15/173* (2006.01)
(52) U.S. Cl. ............................ 709/242; 709/206
(58) Field of Classification Search ............... 709/242, 709/245, 206, 207
See application file for complete search history.

(56) References Cited

U.S. PATENT DOCUMENTS

| 5,225,826 | A | * | 7/1993 | DeLuca et al. ............ 340/7.52 |
| 5,418,528 | A | | 5/1995 | Hosack et al. |
| 5,740,230 | A | | 4/1998 | Vaudreuil |
| 5,966,714 | A | | 10/1999 | Huang et al. |
| 7,209,949 | B2 | | 4/2007 | Mousseau et al. |
| 2003/0055902 | A1 | | 3/2003 | Amir et al. |
| 2003/0187938 | A1 | * | 10/2003 | Mousseau et al. .......... 709/206 |
| 2005/0165861 | A1 | | 7/2005 | Christie et al. |

* cited by examiner

*Primary Examiner*—Frantz B Jean
(74) *Attorney, Agent, or Firm*—Daniel McLoughlin; Hoffman Warnick LLC

(57) ABSTRACT

The present invention provides a method, system and program product for replicating message status changes across messaging systems. Specifically, under the present invention, when a status of a message for a user is changed on a messaging system, the status change is entered into a log associated with the user along with a clock time of the messaging system. The status change is then replicated to a replica messaging system along with the clock time of the original messaging system. Upon receipt, the replica messaging system will ensure that the status change is the most recent activity for the message. If so, the status change will be entered into a log of the replica messaging system along with the clock time of the original messaging system and a clock time of the replica messaging system.

30 Claims, 4 Drawing Sheets

SYSTEM AND PROGRAM PRODUCT FOR REPLICATING MESSAGE STATUS CHANGES ACROSS MESSAGING SYSTEMS

The current application is a continuation application of U.S. patent application Ser. No. 10/730,246, filed on Dec. 8, 2003 now U.S. Pat. No. 7,478,131, which is hereby incorporated by reference.

BACKGROUND OF THE INVENTION

1. Field of the Invention

In general, the present invention provides a method, system and program product for replicating message status changes across (replica) messaging systems. In addition, the present invention provides a method, system and program product for maintaining log chronology for message status changes replicated across the messaging systems.

2. Related Art

As the use of electronic messaging such as electronic mail becomes more pervasive, there is a growing need to provide replication among electronic mail systems. Specifically, due to the distributed nature of many of today's computing infrastructures, many organizations could benefit from the redundancy provided in having multiple replicas of its electronic mail system. In such a system, each such replica could contain a database that tracks the activity of each user. For example, as a user of system "A" reads a message, a corresponding entry could be made in the database of system "A." A similar entry would be made if the user later marked the same message as "unread." If system "B" is a replica of system "A," such entries should be replicated thereto. Unfortunately, no existing system currently provides an optimal way to make such replication. That is, no existing system provides a way to optimally ensure that each replica has an identical view of each user's activity. This is especially the case, for example, where a user changes a status of a message to "read" on system "A" and later to "unread" on system "B." In such a scenario, there currently no way to ensure that the both systems reflect identical versions of the most recent information.

Additional problems would exist in maintaining log chronology for message status changes. Specifically, as is known, the clocks of computer systems within a distributed network are often not synchronized. Accordingly, the clock for system "A" could report a time of 1:00 PM, while the clock for system "B" could report a time of 1:10 PM. With such differences, there is a chance that a more recent status change on a particular system could be improperly "trumped" by a previous status change replicated from another system. This is yet another issue no current system addresses.

In view of the foregoing, there exists a need for a method, system and program product for replicating message status changes across (replica) messaging systems. In addition, the need exists for a method, system and program product for maintaining log chronology for message status changes replicated across the messaging systems.

SUMMARY OF THE INVENTION

In general, the present invention first provides a method, system and program product for replicating message status changes across (replica) messaging systems. Specifically, under the present invention, when a status of a message for a user is changed on a first messaging system, a corresponding entry is made in a log associated with the user on the first messaging system. Thereafter, the entry is communicated to a second messaging system that also has a log associated with the user. Before the entry is formally replicated, however, it is first determined whether the status change is more recent than any other status changes that might exist for the same message with the log of the second messaging system. If so, the entry is replicated. If not, the entry is discarded from the second messaging system. In addition, the present invention provides a method, system and program product for maintaining log chronology for message status changes replicated across the systems. Specifically, when status change is entered into the log of the first messaging system, it is entered along with a clock time of the first messaging system. Thereafter, the entry containing the status change and the clock time is replicated to the second messaging system. If the entry is to be logged in the log of the second messaging system, it is logged along with the clock time of the first messaging system as well as a clock time of the second messaging system (i.e., that corresponds to the clock time of the first messaging system when the status change occurred).

A first aspect of the present invention provides a method for replicating message status changes across messaging systems, comprising: changing a status of a message for a user on a first messaging system; entering the status change into a log associated with the user on the first messaging system; communicating the status change to a second messaging system, wherein the second messaging system is a replica of the first messaging system; and determining, on the second messaging system, if the status change is more recent than any other status changes of the message within a log associated with the user on the second messaging system.

A second aspect of the present invention provides a method for replicating message status changes across messaging systems, comprising: providing a first messaging system having a first set of logs corresponding to a set of users, wherein the first set of logs includes entries reflecting status changes for electronic messages received by the set of users; communicating the first set of logs to a second messaging system having a second set of logs corresponding to the set of users; and determining, on the second messaging system, if the entries within the first set of logs are more recent than existing entries within the second set of logs.

A third aspect of the present invention provides a system for replicating message status changes across messaging systems, comprising: a log entry system for entering a status change of a message for a user into a log associated with the user on a first messaging system; and a replication system for communicating the status change to a second messaging system, wherein the second messaging system includes a precedence system for determining whether the status change for the message is more recent than any other status changes for the message previously entered into a log associated with the user on the second messaging system.

A fourth aspect of the present invention provides a system for replicating message status changes across messaging systems, comprising: a log entry system for entering status changes of messages for a user into a log associated with the user on a first messaging system; a replication system for communicating the status changes a second messaging system; a precedence system for determining whether a status change for a particular message received from the second messaging system is more recent than any status changes for the particular message previously entered into the log; and a table maintenance system for maintaining an unread table on the first messaging system that identifies any messages for the user that are unread.

A fifth aspect of the present invention provides a program product stored on a recordable medium for replicating message status changes across messaging systems, which when executed comprises: program code for entering a status change of a message for a user into a log associated with the user on a first messaging system; and program code for communicating the status change to a second messaging system, wherein the second messaging system includes program code for determining whether the status change for the message is more recent than any other status changes for the message previously entered into a log associated with the user on the second messaging system.

A sixth aspect of the present invention provides a method for maintaining log chronology for message status changes replicated across messaging systems, comprising: changing a status of a message for a user on a first messaging system; entering the status change into a log associated with the user on the first messaging system, wherein the status change is entered into the log along with a clock time of the first messaging system; communicating the status change and the clock time of the first messaging system to a second messaging system; and entering the status change into a log associated with the user on the second messaging system, wherein the status change is entered into the log associated with the user on the second messaging system with the clock time of the first messaging system and a clock time of the second messaging system.

A seventh aspect of the present invention provides a system for maintaining log chronology for message status changes replicated across messaging systems, comprising: a log entry system for entering a status change of a message for a user into a log associated with the user on a first messaging system, wherein the status change is entered into the log along with a clock time of the first messaging system; and a replication system for communicating the status change and the clock time of the first messaging system to a second messaging system, wherein the status change is entered into a log associated with the user on the second messaging system along with the clock time of the first messaging system and a clock time of the second messaging system.

An eighth aspect of the present invention provides a program product stored on a recordable medium for maintaining log chronology for message status changes replicated across messaging systems, which when executed comprises: program code for entering a status change of a message for a user into a log associated with the user on a first messaging system, wherein the status change is entered into the log along with a clock time of the first messaging system; and program code for communicating the status change and the clock time of the first messaging system to a second messaging system, wherein the status change is entered into a log associated with the user on the second messaging system along with the clock time of the first messaging system and a clock time of the second messaging system.

Therefore, the present invention first provides a method, system and program product for replicating message status changes across (replica) systems. The present invention also provides a method, system and program product for maintaining log chronology for message status changes replicated across the systems.

BRIEF DESCRIPTION OF THE DRAWINGS

These and other features of this invention will be more readily understood from the following detailed description of the various aspects of the invention taken in conjunction with the accompanying drawings in which.

Figure 1:
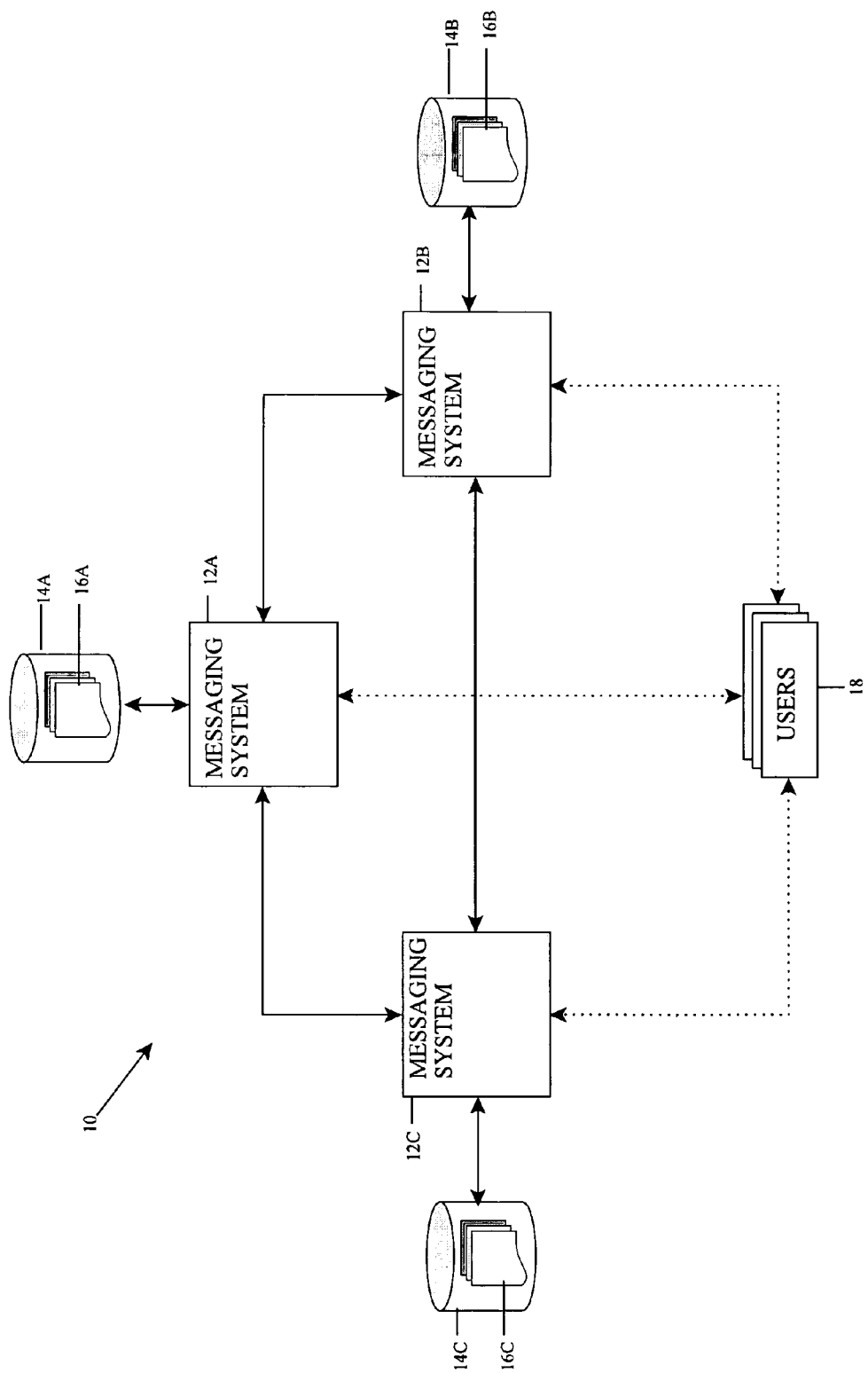
FIG. 1 depicts an illustrative replication architecture according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention first provides a method, system and program product for replicating message status changes across (replica) messaging systems. Specifically, under the present invention, when a status of a message for a user is changed on a first messaging system, a corresponding entry is made in a log associated with the user on the first messaging system. Thereafter, the entry is communicated to a second messaging system that also has a log associated with the user. Before the entry is formally replicated, however, it is first determined whether the status change is more recent than any other status changes that might exist for the same message with the log of the second messaging system. If so, the entry is replicated. If not, the entry is discarded from the second messaging system. In addition, the present invention provides a method, system and program product for maintaining log chronology for message status changes replicated across the systems. Specifically, when status change is entered into the log of the first messaging system, it is entered along with a clock time of the first messaging system. Thereafter, the entry containing the status change and the clock time is replicated to the second messaging system. If the entry is to be logged in the log of the second messaging system, it is logged along with the clock time of the first messaging system as well as a clock time of the second messaging system (i.e., that corresponds to the clock time of the first messaging system when the status change occurred).

It should be understood in advance that as used herein, the term "message" typically refers to an electronic message such as an electronic mail message, an instant message, etc. In any event, referring now to FIG. 1, an illustrative replication architecture 10 according to the present invention is shown. As depicted, architecture 10 depicts messaging systems 12A-C, which users 18 can access to perform message-related activities (i.e., read or unread messages). In a typical embodiment, messaging systems 12A-C are replicas of one another that function in an electronic messaging environment. For example, messaging systems 12A-C could be electronic mail servers that function within a network environment. In such as case, communication between messaging systems 12A-C could occur over any type of network such as the Internet, a local area network (LAN), a wide area network (WAN), a virtual private network (VPN), etc. As such communication could occur via a direct hardwired connection (e.g., serial port), or via an addressable connection that may utilize any combination of wireline and/or wireless transmission methods. Any conventional network connectivity, such as Token Ring, Ethernet, WiFi or other conventional communications standards could be utilized. Moreover, connectivity could be provided by conventional TCP/IP sockets-based protocol.

Regardless, as further shown, each messaging system 12A-C includes a storage unit/database 14A-C that contains a set (e.g., one or more) of logs 16A-C. Under the present invention, each user 18 typically has his/her own log 16A-C within each storage unit 14A-C. Logs 16A-C generally contain entries that reflect status changes of messages (i.e., message activity) for users 18. For example, if user "A" read message "X" via messaging system 12A, a corresponding entry will be made in the log 16A associated with user "A." Similarly, if user "A" later marked the same message as "unread" via messaging system 12A, another entry would be made in the log 16A associated with user "A."

In providing the architecture 10 shown in FIG. 1, the present invention also provides accurate replication of message status changes among messaging systems 12A-C. Specifically, using the example above, when user "A" reads message "X" via messaging system 12A, and an entry is made in his/her associated log 16A, that status change is replicated to the other logs 16B-C associated with user "A" on messaging systems 12B-C. In providing such replication, the present invention takes steps to ensure that proper log "precedence" and "chronology" is maintained (as will be further described below).

Figure 2:
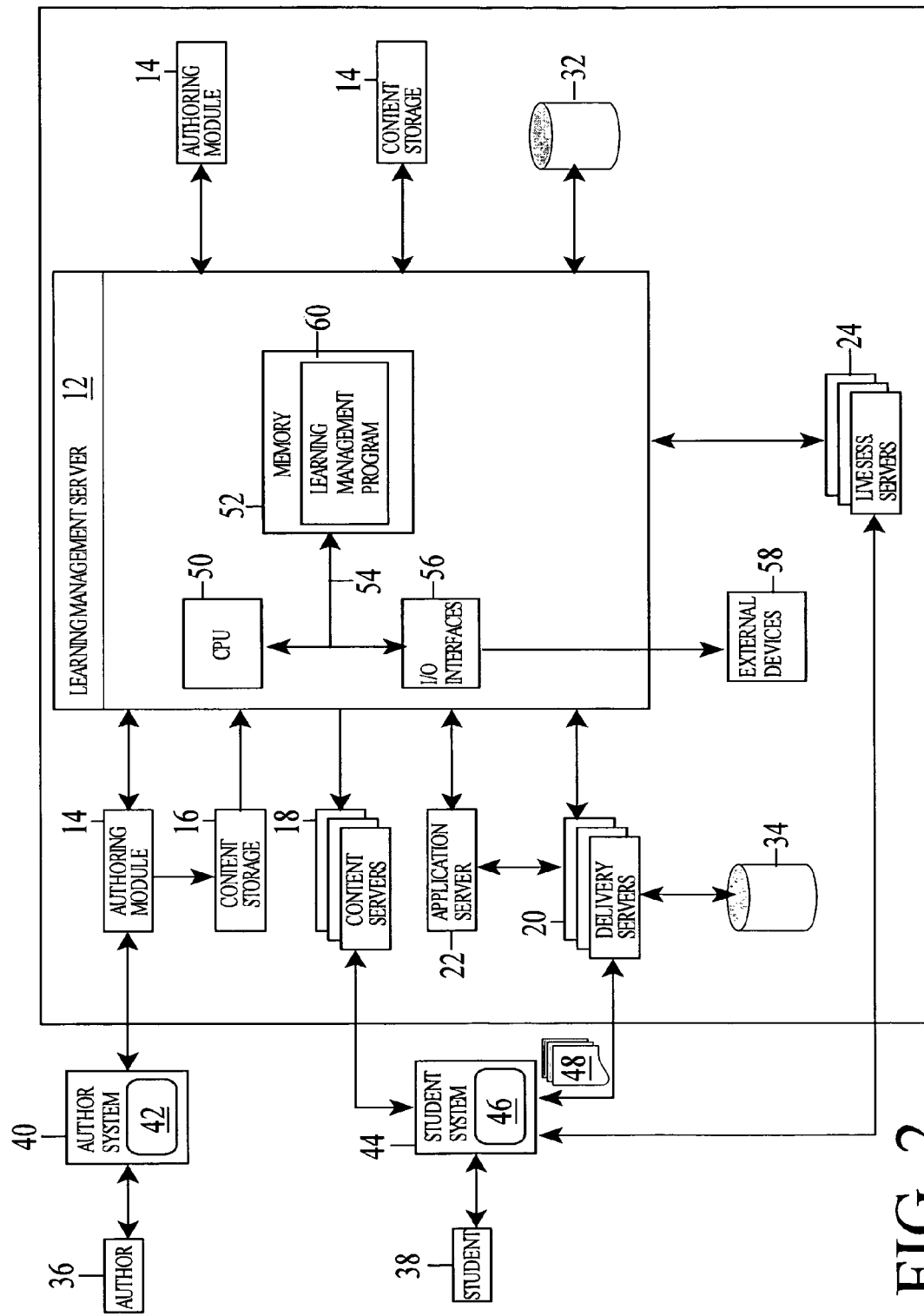
FIG. 2 depicts a more detailed diagram of the illustrative replication architecture of FIG. 1.

Referring now to FIG. 2, a more detailed diagram of architecture 10 is shown. It should be understood that architecture 10 of FIGS. 1 and 2 (e.g., the quantity of messaging systems 12A-C) is intended to be illustrative only and is not intended to limit the teachings herein. In any event, in FIG. 2, user 18 is shown communicating with messaging system 12A. It should be appreciated that although user 18 is shown directly accessing messaging system 12A, user 18 could alternatively communicate with messaging system 12A indirectly (i.e., over a network as described above) via a computerized "user system" (not shown) such as a personal computer, laptop hand held device, etc. In such a case, communication could occur in a client-server or server-server environment. Furthermore, although user 18 is shown as communicating specifically with messaging system 12A, it should be appreciated that user 18 could actually communicate with any of messaging systems 12A-C (as depicted in FIG. 1).

As further depicted, messaging system 12A generally comprises central processing unit (CPU) 22, memory 24, bus 26, input/output (I/O) interfaces 28, external devices/resources 30 and storage unit 14A. CPU 22 may comprise a single processing unit, or be distributed across one or more processing units in one or more locations, e.g., on a client and computer system. Memory 24 may comprise any known type of data storage and/or transmission media, including magnetic media, optical media, random access memory (RAM), read-only memory (ROM), a data cache, etc. Moreover, similar to CPU 22, memory 24 may reside at a single physical location, comprising one or more types of data storage, or be distributed across a plurality of physical systems in various forms.

I/O interfaces 28 may comprise any system for exchanging information to/from an external source. External devices/resources 30 may comprise any known type of external device, including speakers, a CRT, LCD screen, hand held device, keyboard, mouse, voice recognition system, speech output system, printer, monitor/display, facsimile, pager, etc. Bus 26 provides a communication link between each of the components in portal server and likewise may comprise any known type of transmission link, including electrical, optical, wireless, etc.

Storage unit 14A can be any system (e.g., database) capable of providing storage for information under the present invention. Such information could include, for example, logs 16A, etc. As such, storage unit 14A could include one or more storage devices, such as a magnetic disk drive or an optical disk drive. In another embodiment, storage unit 14A includes data distributed across, for example, a local area network (LAN), wide area network (WAN) or a storage area network (SAN) (not shown). Although not shown, additional components, such as cache memory, communication systems, system software, etc., may be incorporated into messaging system 12A. In addition, it should also be appreciated that although not shown, messaging systems 12B-C (and any "user system") would likely include computerized components similar to messaging system 12A. Such components have not been shown for brevity purposes.

Shown in memory 24 of messaging system 12A is status system 34A. Status system 34A could be incorporated as part of a messaging program such as an electronic mail program that is loaded on messaging system 12A. In general, status system 34A-C includes log entry system 36A, replication system 38A, precedence system 40A, table maintenance system 42A and log purging systems 44A. Identical status systems 34B-C are also typically provided on messaging systems 12B-C (e.g., within memory). Status systems 34A-C are configured to provide accurate replication of message status changes across messaging systems 12A-C. For example, assume user 18 accesses message server 12A and reads message "X." In such a case, log entry system 36A will enter the status change into the log 16A that is associated with user 18. In a typical embodiment, log entry system 36A will create an entry for the status change at the end of the log 16A. Thus, the last entries in log 16A will reflect the most message recent activity for user 18.

In entering the status change in the associated log 16A, log entry system will also ensure proper log chronology. Specifically, it could be the case that messaging systems 12A-C, although replicas, have clocks that are out of synch. For example, messaging system 12A could report a time of 1:00 PM, while the clocks of messaging systems 12B-C report times of 1:10 PM and 1:20 PM, respectively. For proper replication, it is important that the timing of status changes be accurately maintained so that recent activities will not be accidentally overridden/trumped by earlier activities. To ensure proper log chronology, all status changes are entered into logs 16A-C with a clock time of a source messaging system sending the replication as well as a clock time of a destination system receiving the replication that corresponds to the time of the source messaging system when the status changed occurred. For messaging systems that are originating the replication operation (i.e., where there is no source messaging system) such as messaging system 12A in the example used herein, the status changed is entered along with only the clock time of originating messaging system. Thus, if user 18 read message "X" on messaging system 12A at 1:00 PM, an illustrative entry could appear as follows:

Message X (AT=1:00 PM, AAT=1:00 PM)

Under the present invention, replication system 38A will periodically replicate logs 16A (or the entries therein) to other messaging systems 12B-C so that all logs 16A-C are identical (i.e., in synch) with each other. A similar replication occurs from other messaging systems 12B-C. Such replication can occur on a scheduled basis, or when a certain quantity of status changes get logged. Moreover, in replicating its logs 16A, messaging system 12A could replicate to all other messaging systems 12B-C, or just to a single messaging system (e.g., 12B) with an instruction for that messaging system (e.g., 12B) to then replicate the logs 16A to another messaging system (e.g., 12C). In the case of the latter, replication would occur in a tree or chain-like. In both scenarios, replication typically occurs on a "chunk" basis. Specifically, logs 16A (as well as 16B-C) are divided into chucks of entries. These chunks are then reviewed by replication system 38A so that only the entries/status changes that were entered into log 16A since the previous/last replication are replicated. This avoids excessive data transfer. In any event, in communicating logs 16A to another messaging system, replication system 38A will communicate both the status changes as well as the times stored therewith.

Upon receipt of the status change for message "X," log entry system 36B of status system 34B on messaging system 12B will first identify its own corresponding clock time and determine if it is different from the clock time of messaging system 12A. In the example, cited above, the clock time for messaging system 12B was ten minutes faster than messaging system 12A. Accordingly, the clock time for messaging system 12B will read 1:10 PM. This difference will be noted by the log entry system of system 12B. However, before the status change is formally replicated into the corresponding log 16B for user 18, precedence system 38B of status system 34B will ensure the proper timing of the status change. For example, if could be the case that user 18 originally read message "X" on messaging system 12A, and then later marked the same message as unread on messaging system 12B before the replication occurred from messaging system 12A. Thus, if the "read" activity were to be replicated into log 16B, it would be out of order and accidentally "trump" the "unread" activity for the message. Accordingly, before any log entry is created pursuant to a replication, precedence system 38B will determine if the status change is more recent than any other status changes for the message in the corresponding log 16B. If it is not, then the status change should be discarded from messaging system 12B (e.g., because it is "stale").

If, however, the status change is more recent than any other status changes for the message stored in the associated log 16B, it will be entered into the appropriate log 16B by log entry system 36B. As indicated above, status changes are entered with the clock times of the source messaging system (if any) and the destination messaging system so that log chronology is maintained. Thus, in entering the status change, log entry system 36B will enter the status change along with the clock times of messaging system 12A and messaging system 12B. Specifically, the destination messaging system will take the AAT of the source messaging system and adjust it based on the clock skew. Since the AAT for messaging system 12A was 1:00 PM, and the time skew between messaging systems 12A and 12B was 10 minutes, log entry system 36B would add 10 minutes to the AAT of 1:00 PM so that the status changes is entered as follows:

Message X (AT=1:00 PM, AAT=1:10 PM)

A similar process would occur when replication occurs to messaging system 12C. For example, assume that the status change is replicated to messaging system 12C. Just as with the replication to messaging system 12B, the status change would be communicated to messaging system 12A along with the clock time of messaging system 12A. Upon receipt, log entry system 26C would identify any time differences. As indicated above, when messaging system 12A is at 1:00 PM, messaging system 12C is at 1:20 PM. Thus, a twenty minute disparity is present. Thereafter, precedence system 40C would determine if the status change is more recent than any other status changes for message "X" in log 16C associated with user 18. If not, then the status change would be discarded from messaging system 12C. If, however, it was the most recent status change, then it would be entered into the log 16C associated with user 18 along with the clock time of the source messaging system (i.e., messaging system 12A) and the destination messaging system (i.e., messaging system 12C). As indicated above, this is accomplished by taking the AAT of the source messaging system (i.e., messaging system 12A) and adjusting it based on the time skew. Since the AAT for messaging system 12A was 1:00 PM, and the time skew between messaging systems 12A and 12C was 20 minutes, log entry system 36C would add 20 minutes to the AAT of 1:00 PM so that the status changes is entered as follows:

Message X (AT=1:00 PM, AAT=1:20 PM)

As further shown in FIG. 2, each status system 34A-C also includes a table maintenance system 42A-C and a log purging system 44-C. Table maintenance systems 42A-C maintains unread tables 46A-C that identify all "unread" messages for the users. For example, when message "X" was originally received for user 18 on messaging system 12A, it was listed in unread table 46A. Assuming user 18 later reads the message, table maintenance system 42A will remove the listing of the message from the table. If the user 18 later marks the same message as "unread," table maintenance system 42A will re-list the message in the table. In keeping an unread table, several options are possible. In a first embodiment, as shown, each messaging system 12A-C could have its own unread table 46A-C. In this embodiment, the table can be updated as replication occurs. For example, assume that user 18 later marked message "X" as "unread" on messaging system 12B. In this event, when the status change was replicated to messaging system 12A and entered into log 16A, table maintenance system 42A would make sure that the unread table 46A listed message "X." In another embodiment, a single centrally located unread table could be maintained that all messaging systems 12A-C can interact with. Log purging systems 44A-C purge logs 16A-C of entries that are older than predetermined time limit (e.g., 90 days). This prevents logs 16A-C from becoming too congested with out of date information.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 3:
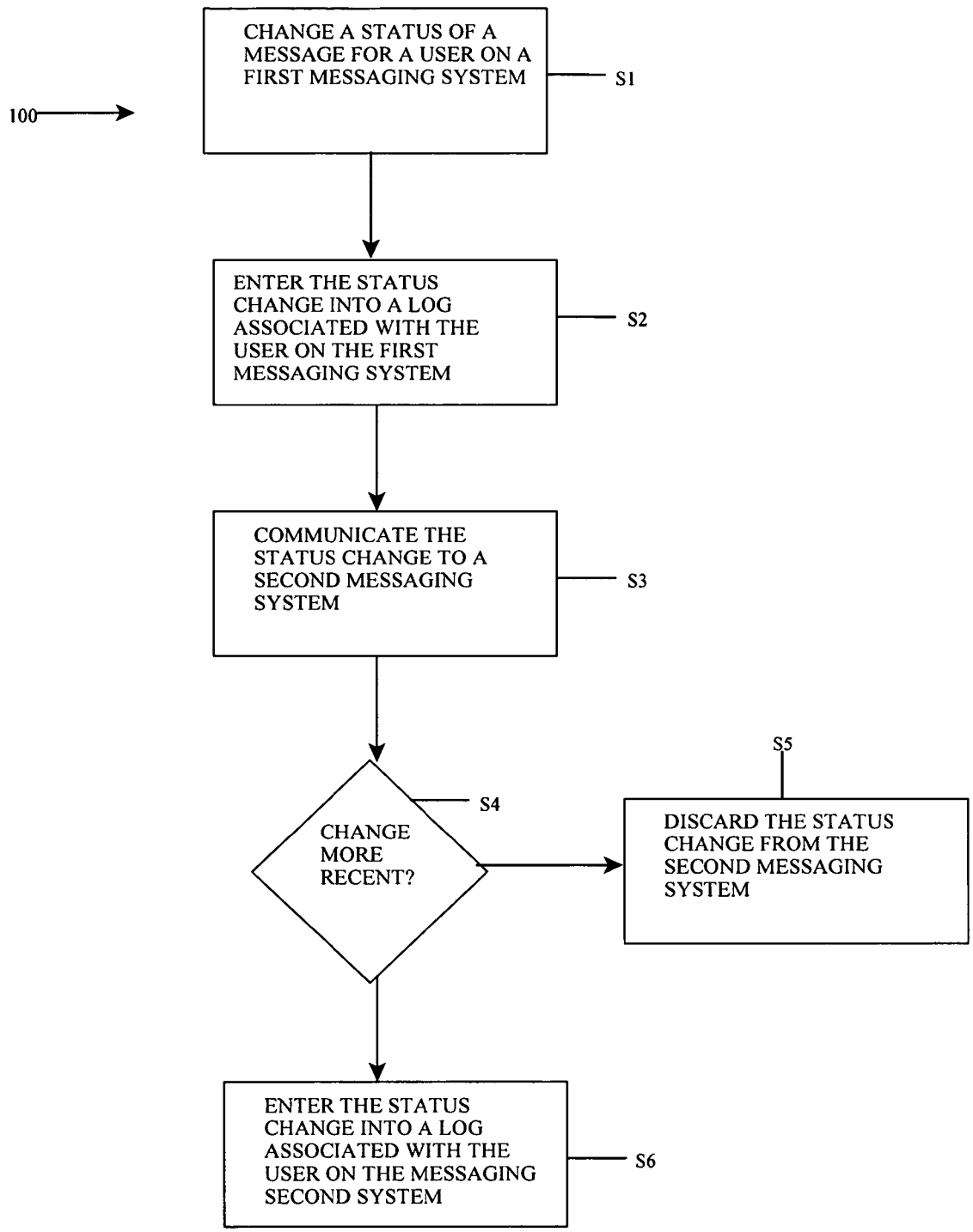
FIG. 3 depicts a first method flow diagram according to the present invention.

Referring now to FIG. 3, a method flow diagram 100 of the status change replication process according to the present invention is shown. As depicted, first step S1 is to change a status of a message for a user on a first messaging system. Second step S2 is to enter the status change into a log associated with the user on the first messaging system. Third step S3 is to communicate the status change to a second messaging system. Fourth step S4 is to determine, on the second messaging system, if the status change is more recent than any other status changes of the message within a log associated with the user on the second messaging system. If not, that status change is discarded from the second messaging system in step S5. If, however, the status change is more recent than other status changes for the message, it is entered into the log associated with the user on the second messaging system in step S6.

Figure 4:
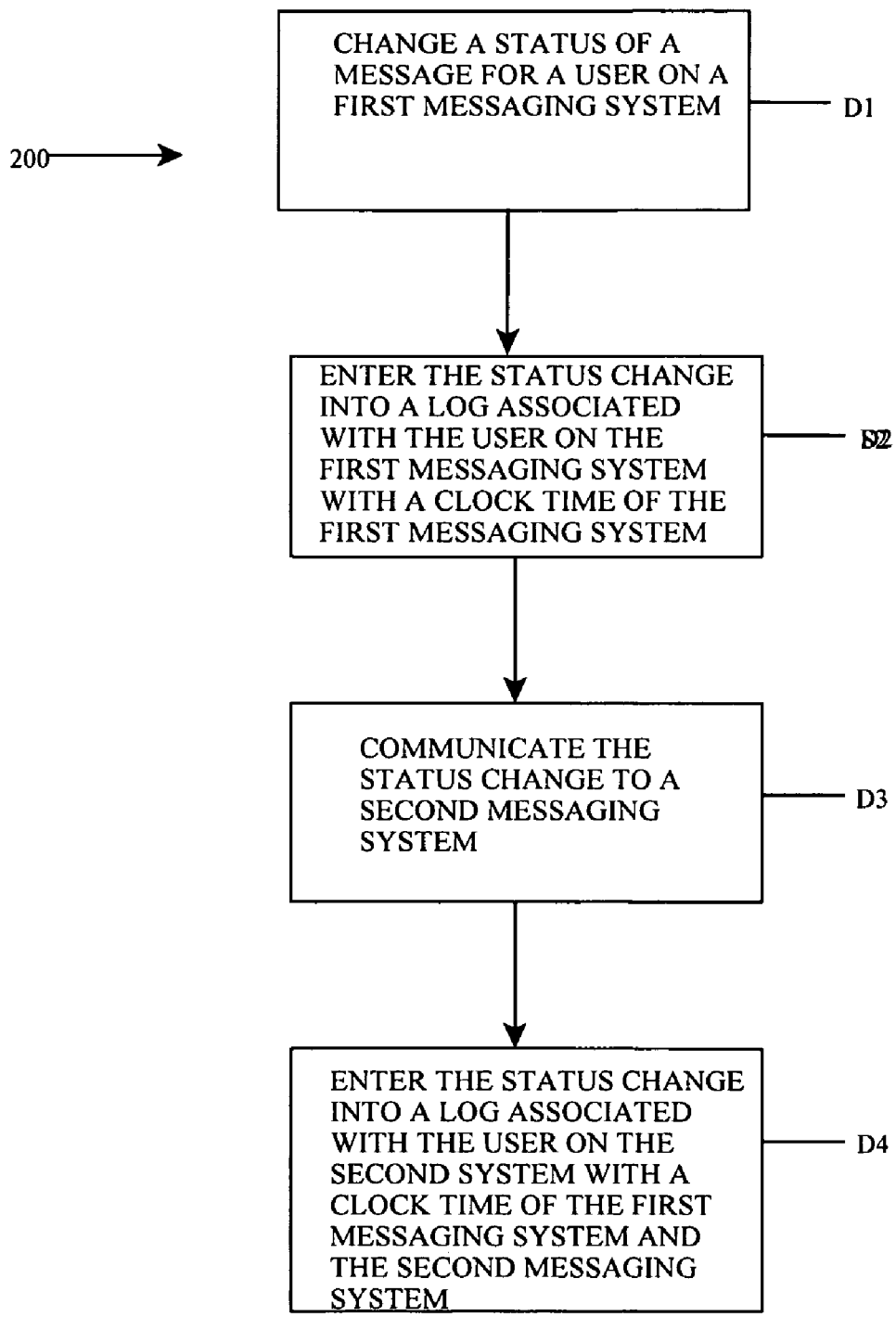
FIG. 4 depicts a second method flow diagram according to the present invention.

Referring now to FIG. 4 a method flow diagram 200 of the log chronology maintenance process according to the present invention is shown. As shown, first step D1 is to change a status of a message for a user on a first messaging system. Second step D2 is to enter the status change into a log associated with the user on the first messaging system with a clock time of the first messaging system. Third step D3 is to communicate the status change to a second messaging system. Fourth step D4 is to enter the status change into a log associated with the user on the second messaging system with the clock time of the first messaging system and a clock time of the second messaging system.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A system for replicating message status changes across messaging systems, comprising:
   a log entry system for entering a status change of a message for a user into a log associated with the user on a first messaging system; wherein every user is associated with its own unique log;
   a replication system for communicating the status change entry from the log associated with the user on the first messaging system to a second messaging system, wherein the second messaging system includes a precedence system for determining, before the status change is replicated, whether the status change for the message is more recent than any other status changes for the message previously entered into a log associated with the user on the second messaging system; and
   an outputting system for processing the status change based on the determining.

2. The system of claim 1, wherein a log entry system on the second messaging system enters the status change for the message into the log associated with the user on the second messaging system if the status change is more recent than the any other status changes for the message.

3. The system of claim 1, wherein the status change is discarded from the second messaging system if the status change is not more recent than the any other status changes for the message.

4. The system of claim 1, further comprising a table maintenance system for maintaining an unread table on the first messaging system that identifies any messages for the user that are unread.

5. The system of claim 1, further comprising a log purging system for purging the log on the first messaging system of any status changes that are older than a predetermined time limit.

6. The system of claim 1, wherein the replication system communicates the status change with a clock time of the first messaging system to the second messaging system.

7. The system of claim 6, wherein the status change is entered into the log associated with the user on the second messaging system with the clock time of the first messaging system and a clock time of the second messaging system, if the status change is more recent that the any other status changes for the message.

8. A system for replicating message status changes across messaging systems, comprising:
   a log entry system for entering status changes of messages for a user into a log associated with the user on a first messaging system; wherein every user is associated with its own unique log;
   a replication system for communicating the status change entries from the log associated with the user on the first messaging system to a second messaging system;
   a precedence system for determining, before a status change is replicated, whether a status change for a particular message received from the second messaging system is more recent than any status changes for the particular message previously entered into the log;
   an outputting system for processing the status change based on the determining; and
   a table maintenance system for maintaining an unread table on the first messaging system that identifies any messages for the user that are unread.

9. The system of claim 8, further comprising a log purging system for purging the log on the first messaging system of any status changes that are older than a predetermined time limit.

10. The system of claim 8, wherein the log entry system enters the status change for the particular message into the log if the status change is more recent than the any other status changes for the particular message.

11. The system of claim 8, wherein the status change for the particular is discarded from the first messaging system if the status change is not more recent than the any other status changes for the particular message.

12. The system of claim 8, wherein the replication system communicates the status changes with a corresponding clock time of the first messaging system to the second messaging system.

13. The system of claim 8, wherein the status changes are entered into a log associated with the user on the second messaging system with the clock time of the first messaging system and a clock time of the second messaging system.

14. A program product stored on a non-transitory recordable medium for replicating message status changes across messaging systems, which when executed comprises:
   program code for entering a status change of a message for a user into a log associated with the user on a first messaging system; wherein every user is associated with its own unique log;
   program code for communicating the status change entry from the log associated with the user on the first messaging system to a second messaging system, wherein the second messaging system includes program code for determining, before the status change is replicated, whether the status change for the message is more recent than any other status changes for the message previously entered into a log associated with the user on the second messaging system; and
   program code for processing the status change based on the determining.

15. The program product of claim 14, wherein program code for entering on the second messaging system enters the status change for the message into the log associated with the user on the second messaging system if the status change is more recent than the any other status changes for the message.

16. The program product of claim 14, wherein the status change is discarded from the second messaging system if the status change is not more recent than the any other status changes for the message.

17. The program product of claim 14, further comprising program code for maintaining an unread table on the first messaging system that identifies any messages for the user that are unread.

18. The program product of claim 14, further comprising program code for purging the log on the first messaging system of any status changes that are older than a predetermined time limit.

19. The program product of claim 14, wherein the program code for communicating communicates the status change with a clock time of the first messaging system to the second messaging system.

20. The program product of claim 19, wherein the status change is entered into the log associated with the user on the second messaging system with the clock time of the first messaging system and a clock time of the second messaging system, if the status change is more recent that the any other status changes for the message.

21. A system for maintaining log chronology for message status changes replicated across messaging systems, comprising:
 a log entry system for entering a status change of a message for a user into a log associated with the user on a first messaging system, wherein every user is associated with its own unique log and wherein the status change entry from the log associated with the user on the first messaging system is entered into the log along with a clock time of the first messaging system;
 a replication system for communicating the status change with the clock time of the first messaging system to a second messaging system, wherein the status change is entered into a log associated with the user on the second messaging system along with the clock time of the first messaging system and a clock time of the second messaging system;
 a precedence system for determining whether status changes of messages for the user received on the first messaging system from the second messaging system are more recent than any other status changes of the messages for the user previously entered into the log associated with the user on the first messaging system; and
 an outputting system for processing the status change based on the determining.

22. The system of claim 21, wherein the message is an electronic mail message.

23. The system of claim 21, further comprising a log purging system for periodically purging the log associated with the user on the first messaging system.

24. The system of claim 21, further comprising a table maintenance system for maintaining an unread table on the first messaging system that identifies any messages for the user that are unread.

25. The system of claim 21, wherein the log entry system enters the status change at an end of the log associated with the user on the first messaging system.

26. A program product stored on a non-transitory recordable medium for maintaining log chronology for message status changes replicated across messaging systems, which when executed comprises:
 program code for entering a status change of a message for a user into a log associated with the user on a first messaging system, wherein every user is associated with its own unique log and wherein the status change is entered into the log along with a clock time of the first messaging system;
 program code for communicating the status change entry from the log associated with the user on the first messaging system with the clock time of the first messaging system to a second messaging system, wherein the status change is entered into a log associated with the user on the second messaging system along with the clock time of the first messaging system and a clock time of the second messaging system;
 program code for determining whether status changes of messages for the user received on the first messaging system from the second messaging system are more recent than any other status changes of the messages for the user previously entered into the log associated with the user on the first messaging system; and
 program code for processing the status change based on the determining.

27. The program product of claim 26, further comprising program code for periodically purging the log associated with the user on the first messaging system.

28. The program product of claim 26, further comprising program code for maintaining an unread table on the first messaging system that identifies any messages for the user that are unread.

29. The program product of claim 26, wherein the program code for entering enters the status change at an end of the log associated with the user on the first messaging system.

30. The program product of claim 26, wherein the message is an electronic mail message.

* * * * *